United States Patent Office

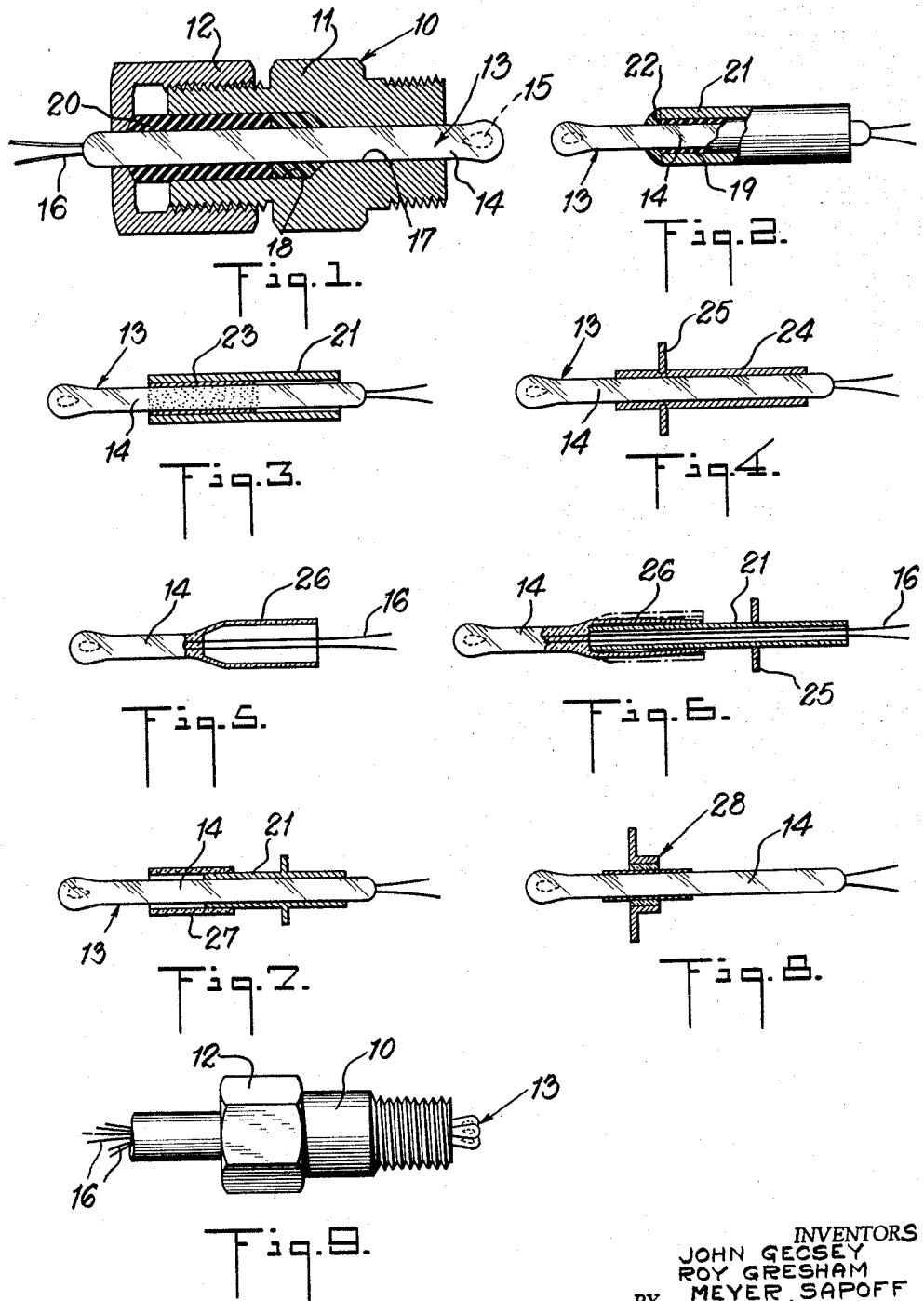

2,959,755
Patented Nov. 8, 1960

2,959,755

THERMISTOR HIGH SPEED HIGH PRESSURE ASSEMBLY

John Gecsey, Rahway, and Roy Gresham and Meyer Sapoff, Union, N.J., assignors to Victory Engineering Corporation, Union, N.J., a corporation of Delaware Filed Mar. 25, 1958, Ser. No. 723,858

9 Claims. (Cl. 338—28)

This invention relates to thermistors and particularly to thermistors used in high pressure systems.

The relatively high temperature coefficient exhibited by semi-conductor thermistors of the metallic oxide class makes them particularly useful in the measurement of physical and environmental conditions such as temperature thermal-conductivity and the flow of various fluids. In order to prevent drift in the electrical characteristics of these components due to reaction with an oxidizing or reducing atmosphere, it is customary to hermetically seal the thermistors in glass to achieve high stability of electrical properties.

Semi-conductor thermistors are often sealed by coating them with glass, sealing bead type units in solid glass probes, and sealing thermistors in an evacuated bulb or a bulb filled with an inert atmosphere.

Thermistors which are to be used in high pressure systems are preferably mounted in an assembly such as a gland or pipe fitting to permit simple insertion of the sensitive element into the pressure system. Presently known methods of hermetically sealing thermistors are limited in that they do not lend themselves readily to uses covering wide temperature and high pressure ranges. In addition, the present sealing structures often seal the thermistors within a metal well thereby giving a relatively slow response rate to changes in environmental conditions.

Still another method for mounting thermistors is to encapsulate or pot the thermistor in a suitable mounting assembly in which the sensitive portion of the thermistor is exposed. Under conditions of high pressure and excessive temperature such structures have been unsatisfactory.

Accordingly, it is an object of the present invention to provide a means for constructing and mounting thermistors to permit their use at extremely wide ranges of temperature and pressure.

Another object of the present invention is to provide a thermistor mounting which will respond rapidly to changes in environmental conditions.

Another object of the present invention is to provide a thermistor mounting which will withstand greater forces of compression in the use thereof.

A feature of the present invention is its use of a metal shell, bonded directly to the glass sealing structure of the thermistor.

Another feature of the present invention is its use of rigid shell structures which will protect the glass thermistor shielding body and facilitate its assembly into a gland or pipe fitting.

The invention consists of the construction, combination and arrangement of parts, as herein illustrated, described and claimed.

In the accompanying drawing, forming a part hereof are illustrated seven forms of embodiment of the invention, and in which:

Figure 1 is a view in longitudinal section of a complete embodiment of a presently known hermetically sealed thermistor carried in a fitting.

Figure 2 is a view in side elevation partially broken away, of a probe type thermistor made in accordance with the present invention.

Figure 3 is a view in longitudinal section showing a second embodiment of the present invention.

Figure 4 is a view in longitudinal section showing a third embodiment of the present invention.

Figure 5 is a view in longitudinal section showing a probe type thermistor before the application of a rigid protective shell thereto.

Figure 6 is a view in longitudinal section of a thermistor probe shown in Figure 5, with the rigid shell applied thereto.

Figure 7 is a view in longitudinal section of a further embodiment of the present invention.

Figure 8 is a still another embodiment, shown in longitudinal section, of a thermistor mounting means in accordance with the present invention.

Figure 9 is a view in side elevation showing a complete fitting with a plurality of thermistors mounted therein in accordance with the present invention.

Referring to the drawings and particularly to Figure 1, there is shown the typical sealant type gland assembly 10, for mounting a thermistor of the probe type consisting of an externally threaded body member 11, having a nut 12 engageable therewith. The body member 11 and the nut 12 are centrally bored to receive therethrough the thermistor probe 13. The probe type thermistor is made up of an elongated glass rod 14 having the thermistor 15 carried in one end thereof. Leads 16 extend from the thermistor 15 through the rod and emerge therefrom at the end of the rod 14 opposite the thermistor 15. The central bore 17 of the body member 11 is enlarged as indicated at 18 to receive a quantity of a suitable sealant 19. The sealant 19 may be neoprene, Teflon, lava, talc, or some other suitable material. A gland follower 20 is also carried within the enlarged bore 18 and is compressed by the nut 12 against the sealant 19. With the probe 13 in the position shown in Figure 1, the nut 12 is tightened upon the gland follower 20 until a hermetic seal is achieved around the said probe. However, this method of assembly has been found to be unsatisfactory where the pressure exceeds 50–100 lbs. per square inch. Where higher pressures are encountered the amount of compression required upon the gland follower often results in cracking the glass stem of the probe 13. In addition, where the pressure is high, the combination of eccentricity or bending along the length of glass stem also results in cracking the structure.

In Figure 2 there is shown a thermistor probe 13 which is provided with a rigid metal shell 21 therearound. The shell 21 is sealed to a portion of the glass stem of the probe 13 by means of a suitable potting or encapsulating compound, such as epoxy resin, or a filled epoxy resin, well known in the art. A suitable high pressure sealant 19 is placed between the shell 21 and the glass rod 14. The entire structure may thereafter be assembled within a fitting such as is shown in Figure 1 with the thermistor or uncovered end of the probe extending out of the fitting for direct contact with the substance or condition to be measured. The assembly shown in Figure 2, while useful, is limited in its range to the temperature range of the potting compound 22 of the sealant 19.

In Figure 3 there is shown a thermistor probe assembly in which the temperature range is limited only by the type of sealant used. In this form of the invention a metallic surface 23 is fired directly on the glass rod 14 of the thermistor probe 13. A metallic shell 21 is thereafter soldered or brazed to the metallic surface 23.

In Figure 4 there is illustrated another type of thermistor assembly in which the pressure range of the structure would be limited only by the type of sealant used in the fitting. In Figure 4 the thermistor probe 13 is partially covered by a non-porous, non-brittle, hard shell which may or may not be metallic and which has a thermal coefficient of expansion such that it will match that of the glass rod 14. The shell 24 is placed over the glass rod 14 and is sealed directly thereto by heating the glass to the point where it flows and forms an intimate bond with the shell 24. The shell 24, in addition to being metal may be formed of ceramic, silica, or some other suitable materal. A flange 25 may be incorporated within the shell 24 for the purpose of securing the assembly within the pipe fitting or gland 10. The flange 25 will prevent longitudinal shifting of the probe within the gland 10 under conditions of high pressure, when a compression type sealant is used. It can also be of metal so that it can be brazed or soldered to the remaining assembly thus eliminating the need of a sealant type construction.

Another means of securing a probe directly to a rigid stem is illustrated in Figures 5 and 6. In this form of the invention the glass rod 14 is provided with an outwardly flared portion 26. The flared portion 26 is adapted to receive therein the rigid shell 21. The glass surrounding the shell 21 is then heated to a point where it will flow and form an intimate bond with the shell 21. As illustrated in Figure 6, the shell 21 may be provided with a flange 25 for the hereinabove described purpose. The leads 16 are led through the central bore in the shell.

In Figure 7 there is illustrated still another embodiment of the present invention in which the shell 21 is slipped over the glass probe 13 and a glass sleeve 27 is placed over part of the shell 21 and the glass stem 14. Thereafter, heat is applied so as to cause the glass 27 to flow forming a bond between the glass sleeve 27 and the shell 21 thereby securing the sleeve to the stem 14. By means of this construction an intimate bond and glass seal is made between the protective shell 21 and the glass rod 14 of the thermistor probe 13.

The assembly shown in Figure 8 constitutes another means of sealing a probe into a high pressure system wherein the glass stem or rod 14 of the probe is fused to a standard hermetic seal type feed-through terminal 28. The hermetic seal may thereafter be soldered, brazed or otherwise sealed to a suitable pressure fitting.

All of the foregoing structures may be suitably fastened to a pipe fitting or gland 10 by soldering or brazing the metallic shell directly to the gland. In the event that rigid shell structures other than metal are employed the outer surface thereof can be metalized by suitable techniques such as spraying, vacuum evaporation, etc., prior to the soldering or brazing operation.

It is within the purview of the present invention to incorporate a plurality of probes within the pipe fitting or gland 10, as illustrated in Figure 9. The rigid shell protected probes such as are hereinabove described, lend themselves to such assemby and will withstand great extremes of pressure and temperature. Units of the type hereinabove described have been used at pressures up to 20,000 lbs. per sq. inch at temperature extremes of 196° C. to +500° C., and there is reason to believe that this range can be extended when a suitable sealant is used or when the sealant is eliminated by soldering or brazing the thermistor shell or flange to the housing or fitting.

Having thus fully described the invention, what is claimed as new and desired to be secured by Letters Patent of the United States, is:

1. A high speed thermistor assembly comprising a thermistor body, leads attached to said thermistor and extending therefrom, a glass covering around the thermistor and said leads and a rigid protective metal shell intimately fused to only that portion of the glass covering which overlies the lead.

2. A high speed thermistor assembly comprising a thermistor body, leads attached to said thermistor and extending therefrom, a glass covering consisting of a rod shaped structure around the thermistor and said leads and a rigid protective metal shell intimately fused to only a portion of the glass covering which overlies the lead.

3. A high speed thermistor assembly according to claim 2 in which the rod is bonded to the shell by a glass sleeve overlying the shell and rod.

4. A high speed thermistor assembly accordance to claim 2 in which the rigid protective shell consists of a hermetic terminal having a tubular feed through.

5. A high speed thermistor assembly comprising a thermistor body, leads attached to said thermistor and extending therefrom, a glass covering around the thermistor and said leads and a rigid protective shell intimately bonded at one end thereof to at least a portion of the glass covering and a sealant between the shell and rod where they are not bonded together.

6. A high speed thermistor assemby comprising a thermistor body, leads attached to said thermistor and extending therefrom, a glass covering around the thermistor and said leads, a metallic surface directly fired to the surface of the glass covering and a rigid protective shell intimately bonded to the metallic surface on the glass covering.

7. A high speed thermistor assembly comprising a thermistor body, leads attached to said thermistor and extending therefrom, a glass covering consisting of a rod shaped structure around the thermistor and said leads, a metallic surface directly fired to the surface of the glass covering and a rigid metal protective shell intimately bonded to at least a portion of the metallic surface on the glass covering.

8. A thermistor assembly for high pressure applications comprising, a thermistor body, leads attached to the thermistor and extending therefrom, a rod shaped glass covering around the thermistor and leads, an outwardly flared hollow portion on said covering, a rigid shell received within the hollow portion, said hollow portion and shell being fused together to form an intimate bond between the covering and shell.

9. A thermistor assembly for high pressure applications comprising, a thermistor body, leads attached to the thermistor and extending therefrom, a rod shaped glass covering around the thermistor and leads, an outwardly flared hollow portion on said covering, a rigid shell received within the hollow portion and around the leads, an outwardly extending flange on said rigid shell, said hollow portion and shell being fused together to form an intimate bond between the covering and shell.

References Cited in the file of this patent

UNITED STATES PATENTS

| | | |
|---|---|---|
| 2,344,648 | Simmons | Mar. 21, 1944 |
| 2,569,714 | Gregory | Oct. 2, 1951 |
| 2,678,366 | Habenstreit | May 11, 1954 |
| 2,685,015 | Weiller | July 27, 1954 |
| 2,740,031 | Addink | Mar. 27, 1956 |
| 2,768,266 | Marsden | Oct. 23, 1956 |
| 2,816,997 | Conrad | Dec. 17, 1957 |